(12) United States Patent
Ikegami et al.

(10) Patent No.: US 8,834,994 B2
(45) Date of Patent: Sep. 16, 2014

(54) TOP PLATE FOR COOKING DEVICE

(75) Inventors: Koji Ikegami, Otsu (JP); Toshimasa Kanai, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 360 days.

(21) Appl. No.: 13/002,989

(22) PCT Filed: Jun. 13, 2009

(86) PCT No.: PCT/JP2009/002690
§ 371 (c)(1),
(2), (4) Date: Jan. 7, 2011

(87) PCT Pub. No.: WO2010/007725
PCT Pub. Date: Jan. 21, 2010

(65) Prior Publication Data
US 2011/0117346 A1     May 19, 2011

(30) Foreign Application Priority Data
Jul. 18, 2008   (JP) .................................. 2008-187391

(51) Int. Cl.
*B32B 7/02* (2006.01)
*B32B 17/06* (2006.01)
*H05B 6/12* (2006.01)
*C03C 17/34* (2006.01)

(52) U.S. Cl.
CPC ................ *H05B 6/1209* (2013.01); *B32B 7/02* (2013.01); *C03C 17/3435* (2013.01); *C03C 17/3482* (2013.01)
USPC ........... 428/216; 428/220; 428/428; 428/432; 428/688; 428/698; 428/699

(58) Field of Classification Search
CPC ........... H05B 36/1209; C03C 17/3482; C03C 17/3435
USPC ......... 428/212–213, 215–216, 220, 688–689, 428/699–700, 704, 426, 428, 432–433, 615, 428/620, 623, 627, 630; 359/359–360, 359/580–582, 586, 589
See application file for complete search history.

(56) References Cited

U.S. PATENT DOCUMENTS

2005/0172829 A1    8/2005   Shimatani et al.
2007/0056961 A1    3/2007   Shimatani et al.

FOREIGN PATENT DOCUMENTS

CN          1646862 A     7/2005
EP          2 233 840 A1    9/2010

(Continued)

OTHER PUBLICATIONS

Machine Translation of JP2005-090906. Retrieved Apr. 6, 2013.*

(Continued)

*Primary Examiner* — Prashant J Khatri
(74) *Attorney, Agent, or Firm* — Keating & Bennett, LLP (57) ABSTRACT

To provide a top plate for a cooking device which has low transmittance in a visible wavelength range and high transmittance in an infrared wavelength range of 3500 nm to 4000 nm. A top plate 1 for a cooking device includes: a glass substrate 10; and a layered coating 2 made of a Si film 11 and a silicon nitride film 12 which are formed on the glass substrate 10. Where $t_1$ represents the thickness of the Si film 11 and $t_2$ represents the thickness of the silicon nitride film 12, $(t_1, t_2)$ in FIG. 1 showing the relation between the thickness $t_1$ of the Si film and the thickness $t_2$ of the silicon nitride film is within the bounds X defined by connecting Points A1 to A36 shown in TABLE 1 in this order with straight lines.

9 Claims, 6 Drawing Sheets

(56) References Cited

FOREIGN PATENT DOCUMENTS

| JP | 2003-109736 A | | 4/2003 | |
|---|---|---|---|---|
| JP | 2003-121261 A | | 4/2003 | |
| JP | 2004-95313 A | | 3/2004 | |
| JP | 2004-333102 A | | 11/2004 | |
| JP | 2005-108586 A | | 4/2005 | |
| JP | 2005090906 A | * | 4/2005 | ............ F24C 15/10 |
| JP | 2005-216583 A | | 8/2005 | |
| JP | 2006-125645 A | | 5/2006 | |

OTHER PUBLICATIONS

Dobrowolski, J.A. (eds. Bass et al.). "Optical Properties of Films and Coatings". Handbook of Optics: vol. I, Fundamentals, Techniques and Design, 2nd ed., (1995); pp. 42.3-42.130.*

Official Communication issued in International Patent Application No. PCT/JP2009/002690, mailed on Oct. 20, 2009.

Official Communication issued in corresponding Chinese Patent Application No. 200980128144.2, mailed on Nov. 26, 2012.

Official Communication issued in corresponding International Application PCT/JP2009002690, mailed on Apr. 29, 2014.

* cited by examiner

TOP PLATE FOR COOKING DEVICE

TECHNICAL FIELD

This invention relates to top plates for cooking devices, and particularly relates to top plates for cooking devices which allow the transmission of infrared light within a wavelength range of 3500 nm to 4000 nm but limit the transmission of light within a visible wavelength range to low levels.

BACKGROUND ART

Electric cooking devices as represented by IH (Induction Heating) cooking devices are conventionally proposed. In such electric cooking devices, generally, a top plate is disposed on a heating mechanism, such as a magnetic field generating coil, and portions of the top plate for resting objects to be heated thereon are formed in a so-called flat-top form. Therefore, in recent years, electric cooking devices are spreading fast as cooking devices excellent in aesthetic appearance and cleanability.

For electric cooking devices, in order to implement some functions, such as automatically setting the temperature of an object to be heated and preventing the temperature of the object to be heated from excessively rising, there is a need for detection of the temperature of the object to be heated. Examples of a method for detecting the temperature of an object to be heated are proposed, for example, in Patent Literatures 1 to 4 listed below, which are methods for detecting the temperature of an object to be heated by detecting the intensity of infrared radiation emitted from the object to be heated or the like.

Specifically, for example, Patent Literatures 1 and 2 below propose techniques for detecting the temperature of a pan by detecting infrared radiation emitted from the bottom of the pan.

Patent Literature 3 below proposes a technique in which a black-body material layer made of a material having high absorbance and emittance of infrared wavelength energy is formed on a top plate and the temperature of an object to be heated is detected by detecting infrared radiation emitted by the black-body material layer.

Patent Literature 4 below proposes a technique in which a coating for emitting infrared radiation is formed on a top plate surface on which an object to be heated is to be rested and the temperature of an object to be heated is detected by detecting infrared radiation emitted from the coating.

In detecting the temperature of an object to be heated using infrared radiation in the above manners, infrared light in a wavelength range of up to 4000 nm is generally used as described in Patent Literature 2 below. However, in a low temperature range near 200° C., for example, the intensity of a wavelength portion up to 2500 nm of infrared light emitted from an object to be heated does not change so much with changes in temperature. Therefore, infrared light in a wavelength range of up to 2500 nm is not suitable for temperature detection in the low temperature range. Furthermore, glass generally hardly transmits light having a wavelength of or near 3000 nm. Accordingly, in detecting the temperature of an object to be heated, infrared light in a wavelength range of 3500 nm to 4000 nm is preferably used because it significantly changes the radiation intensity depending on the temperature of the object to be heated even in the low temperature range and allows a glass substrate to transmit it at a transmittance above a certain level.

Meanwhile, in detecting the temperature of an object to be heated using infrared light, infrared light emitted from the object to be heated passes through the top plate and is then detected by a detecting mechanism disposed under the top plate. Therefore, in electric cooking devices employing the method for detecting an object to be heated using infrared light, the top plates are required to have high transmittance in a wavelength range of 3500 nm to 4000 nm.

In addition, electric cooking devices are required to have the invisibility of their internal structure disposed under the top plate, such as a heating mechanism and wiring, from an aesthetic viewpoint. Therefore, in electric cooking devices, the top plates are also required to have low transmittance in a visible wavelength range. An example of a method for lowering the transmittance of a top plate in a visible wavelength range is disclosed, for example, in Patent Literature 5 below, which is a method of forming a light shielding film, together with an oxidation preventing film, in the top plate. Patent Literature 5 discloses, as specific examples of the oxidation resistant film and light blocking film, a silicon nitride film and a Si film, respectively.

CITATION LIST

Patent Literature

Patent Literature 1: Published Japanese patent Application No. 2005-216583
Patent Literature 2: Published Japanese patent Application No. 2004-95313
Patent Literature 3: Published Japanese patent Application No. 2003-121261
Patent Literature 4: Published Japanese patent Application No. 2005-108586
Patent Literature 5: Published Japanese patent Application No. 2004-333102

SUMMARY OF INVENTION

Technical Problem

However, the top plate disclosed in Patent Literature 5, although having achieved low transmittance in a visible wavelength range, has not achieved high transmittance in an infrared wavelength range of 3500 nm to 4000 nm.

An object of the present invention is to provide a top plate for a cooking device which has low transmittance in a visible wavelength range and high transmittance in an infrared wavelength range of 3500 nm to 4000 nm.

Solution to Problem

Figure 1:
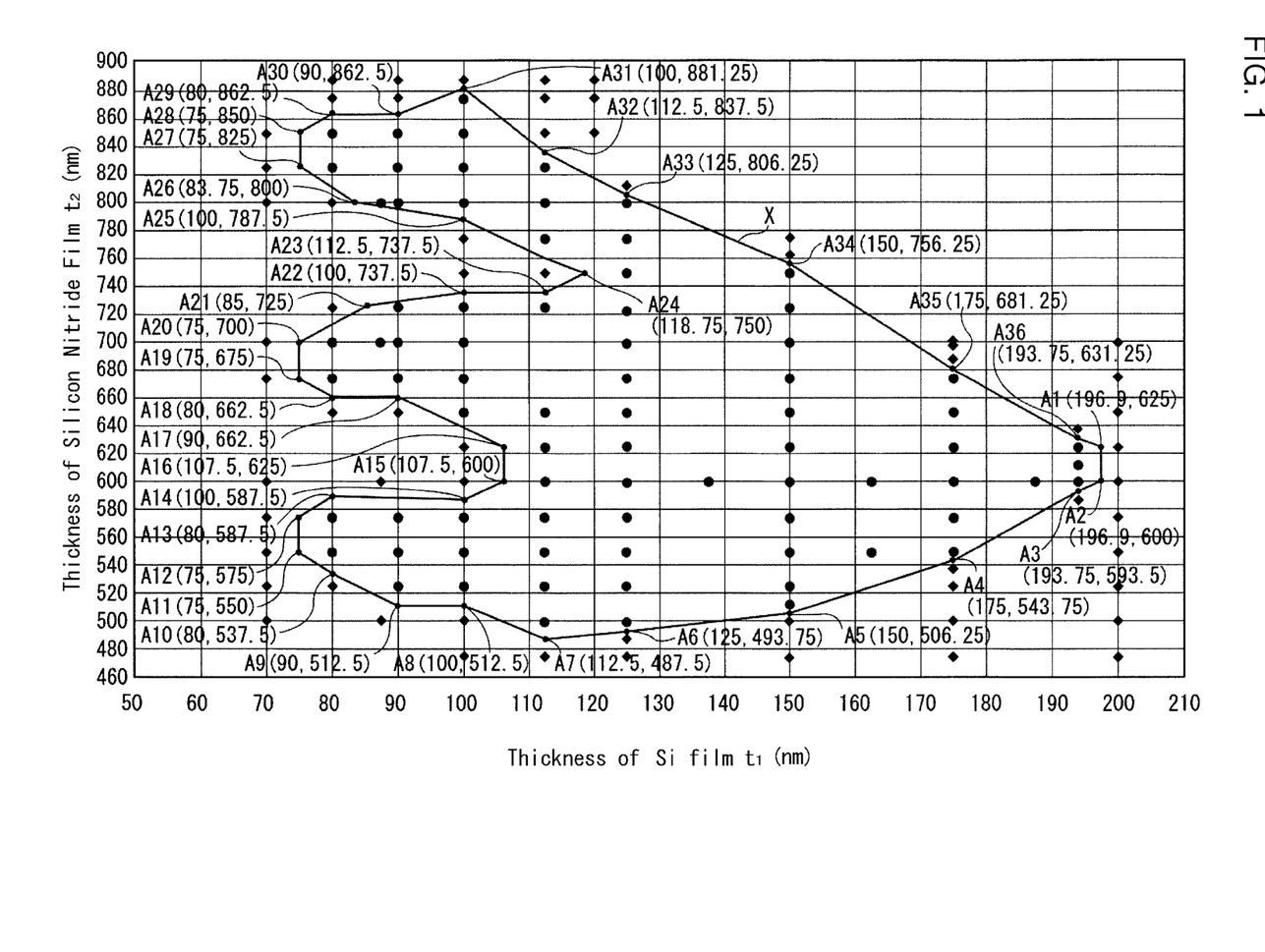
FIG. 1 is a graph showing the light blocking properties at a wavelength of 550 nm and infrared transmission properties of a layered coating when the thickness $t_1$ of a Si film and the thickness $t_2$ of a silicon nitride film were changed.

A top plate for a cooking device of the present invention includes: a glass substrate; and a layered coating made of a Si film and a silicon nitride film which are formed on the glass substrate, wherein where $t_1$ represents the thickness of the Si film and $t_2$ represents the thickness of the silicon nitride film, $(t_1, t_2)$ in FIG. 1 showing the relation between the thickness $t_1$ of the Si film and the thickness $t_2$ of the silicon nitride film is within the bounds X defined by connecting Points A1 to A36 shown in the following TABLE 1 in this order with straight lines:

TABLE 1

| Point | $t_1$ (nm) | $t_2$ (nm) |
|---|---|---|
| A1 | 196.9 | 625 |
| A2 | 196.9 | 600 |

TABLE 1-continued

| Point | $t_1$ (nm) | $t_2$ (nm) |
|---|---|---|
| A3 | 193.75 | 593.5 |
| A4 | 175 | 543.75 |
| A5 | 150 | 506.25 |
| A6 | 125 | 493.75 |
| A7 | 112.5 | 487.5 |
| A8 | 100 | 512.5 |
| A9 | 90 | 512.5 |
| A10 | 80 | 537.5 |
| A11 | 75 | 550 |
| A12 | 75 | 575 |
| A13 | 80 | 587.5 |
| A14 | 100 | 587.5 |
| A15 | 107.5 | 600 |
| A16 | 107.5 | 625 |
| A17 | 90 | 662.5 |
| A18 | 80 | 662.5 |
| A19 | 75 | 675 |
| A20 | 75 | 700 |
| A21 | 85 | 725 |
| A22 | 100 | 737.5 |
| A23 | 112.5 | 737.5 |
| A24 | 118.75 | 750 |
| A25 | 100 | 787.5 |
| A26 | 83.75 | 800 |
| A27 | 75 | 825 |
| A28 | 75 | 850 |
| A29 | 80 | 862.5 |
| A30 | 90 | 862.5 |
| A31 | 100 | 881.25 |
| A32 | 112.5 | 837.5 |
| A33 | 125 | 806.25 |
| A34 | 150 | 756.25 |
| A35 | 175 | 681.25 |
| A36 | 193.75 | 631.25 |

Figure 2:
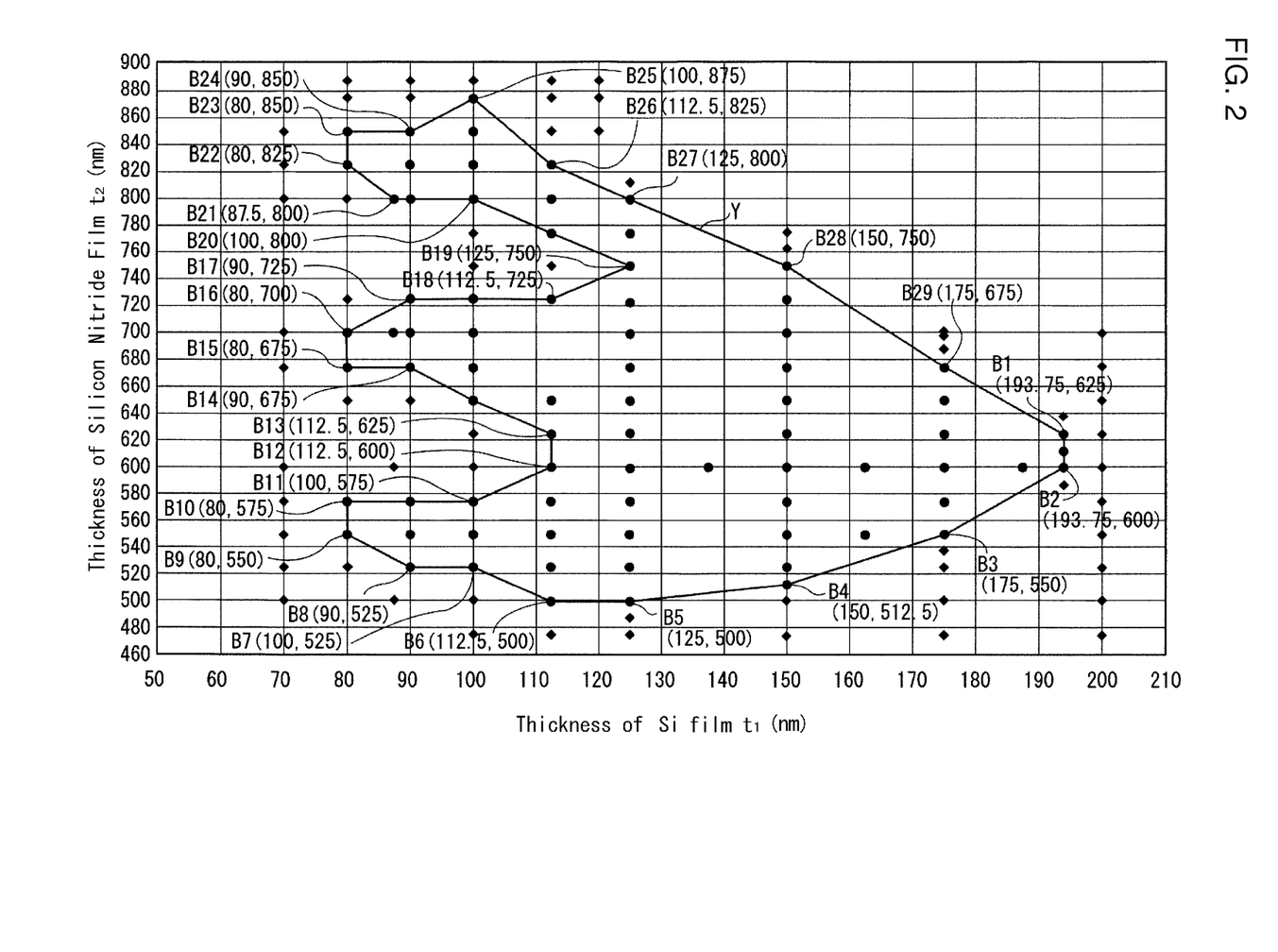
FIG. 2 is a graph showing the light blocking properties at a wavelength of 550 nm and infrared transmission properties of the layered coating when the thickness $t_1$ of the Si film and the thickness $t_2$ of the silicon nitride film were changed.

The Si film and the silicon nitride film are preferably formed so that $(t_1, t_2)$ in FIG. 2 showing the relation between the thickness $t_1$ of the Si film and the thickness $t_2$ of the silicon nitride film is within the bounds Y defined by connecting Points B1 to B29 shown in the following TABLE 2 in this order with straight lines.

TABLE 2

| Point | $t_1$ (nm) | $t_2$ (nm) |
|---|---|---|
| B1 | 193.75 | 625 |
| B2 | 193.75 | 600 |
| B3 | 175 | 550 |
| B4 | 150 | 512.5 |
| B5 | 125 | 500 |
| B6 | 112.5 | 500 |
| B7 | 100 | 525 |
| B8 | 90 | 525 |
| B9 | 80 | 550 |
| B10 | 80 | 575 |
| B11 | 100 | 575 |
| B12 | 112.5 | 600 |
| B13 | 112.5 | 625 |
| B14 | 90 | 675 |
| B15 | 80 | 675 |
| B16 | 80 | 700 |
| B17 | 90 | 725 |
| B18 | 112.5 | 725 |
| B19 | 125 | 750 |
| B20 | 100 | 800 |
| B21 | 87.5 | 800 |
| B22 | 80 | 825 |
| B23 | 80 | 850 |
| B24 | 90 | 850 |
| B25 | 100 | 875 |
| B26 | 112.5 | 825 |
| B27 | 125 | 800 |
| B28 | 150 | 750 |
| B29 | 175 | 675 |

Advantageous Effects of Invention

According to the present invention, since the thickness $t_1$ of the Si film and the thickness $t_2$ of the silicon nitride film are within the above bounds, a top plate for a cooking device can be provided which has low transmittance in a visible wavelength range and high transmittance in an infrared wavelength range of 3500 nm to 4000 nm.

DESCRIPTION OF EMBODIMENTS

Figure 6:
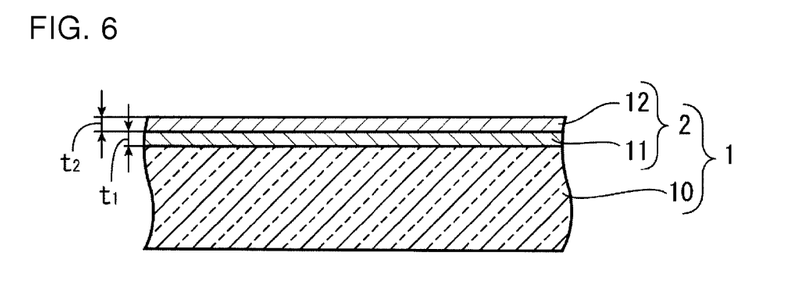
FIG. 6 is a schematic cross-sectional view of a top plate for a cooking device.

FIG. 6 is a schematic cross-sectional view of a top plate 1 for a cooking device according to this embodiment. As shown in FIG. 6, the top plate 1 for a cooking device includes a glass substrate 10. The glass substrate 10 preferably has high thermal resistance and high strength, has a low thermal expansion coefficient and can transmit infrared light within a wavelength range of 2500 to 3000 nm. Examples of the glass substrate 10 that can be suitably used include $Li_2O$—$Al_2O_3$—$SiO_2$-based crystallized glass substrates. The thickness of the glass substrate 10 is not particularly limited but is set to be about 3 mm to about 5 mm, for example.

A layered coating 2 is formed on the glass substrate 10. The layered coating 2 includes a Si film 11 and a silicon nitride film 12. Specifically, in this embodiment, the Si film 11 is formed on top of the glass substrate 10, and the silicon nitride film 12 is formed on top of the Si film 11. If in this manner a silicon nitride film 12 having excellent thermal resistance is formed on a Si film 11 having low thermal resistance, the deterioration (such as oxidation) of the Si film 11 due to heat can be reduced. Therefore, the thermal resistance of the top plate 1 for a cooking device can be improved.

The Si film 11 is a film made substantially of Si. For example, the Si film 11 may be made only of Si or may contain an additive or impurity other than Si. The Si film 11 may contain, for example, a transition element, such as Al, as an additive or an impurity. The total content of additives and impurities in the Si film 11 is not particularly limited, but is preferably 1% by weight or less, for example. The reason for this is that if the content of additives and impurities in the Si film 11 is high, the infrared transmittance of the Si film may be reduced.

The silicon nitride film 12 is a film made substantially of silicon nitride. The composition of silicon nitride used is not particularly limited but is preferably $Si_3N_4$, for example. The silicon nitride film 12, likewise the Si film 11, may also contain an additive or an impurity.

The process for forming the Si film 11 and the silicon nitride film 12 is not particularly limited, and each of the Si film 11 and the silicon nitride film 12 can be formed by various well-known thin film formation processes. Examples of the process for forming the Si film 11 and the silicon nitride film 12 include a sputtering process, a chemical vapor deposition (CVD) process, a physical vapor deposition process and an ion plating process. Among them, a sputtering process is preferably used as a process for forming the Si film 11 and the silicon nitride film 12.

In this embodiment, where $t_1$ represents the thickness of the Si film 11 and $t_2$ represents the thickness of the silicon nitride film 12, $(t_1, t_2)$ in FIG. 1 showing the relation between the thickness $t_1$ of the Si film 11 and the thickness $t_2$ of the silicon nitride film 12 is set to be within the bounds X defined by connecting Points A1 to A36 shown in the following TABLE 3 in this order with straight lines. Thus, as shown in examples described later, the transmittance in a visible wavelength range can be low and the transmittance in an infrared wavelength range of 3500 nm to 4000 nm can be high.

TABLE 3

| Point | $t_1$ (nm) | $t_2$ (nm) |
|---|---|---|
| A1 | 196.9 | 625 |
| A2 | 196.9 | 600 |
| A3 | 193.75 | 593.5 |
| A4 | 175 | 543.75 |
| A5 | 150 | 506.25 |
| A6 | 125 | 493.75 |
| A7 | 112.5 | 487.5 |
| A8 | 100 | 512.5 |
| A9 | 90 | 512.5 |
| A10 | 80 | 537.5 |
| A11 | 75 | 550 |
| A12 | 75 | 575 |
| A13 | 80 | 587.5 |
| A14 | 100 | 587.5 |
| A15 | 107.5 | 600 |
| A16 | 107.5 | 625 |
| A17 | 90 | 662.5 |
| A18 | 80 | 662.5 |
| A19 | 75 | 675 |
| A20 | 75 | 700 |
| A21 | 85 | 725 |
| A22 | 100 | 737.5 |
| A23 | 112.5 | 737.5 |
| A24 | 118.75 | 750 |
| A25 | 100 | 787.5 |
| A26 | 83.75 | 800 |
| A27 | 75 | 825 |
| A28 | 75 | 850 |
| A29 | 80 | 862.5 |
| A30 | 90 | 862.5 |
| A31 | 100 | 881.25 |
| A32 | 112.5 | 837.5 |
| A33 | 125 | 806.25 |
| A34 | 150 | 756.25 |
| A35 | 175 | 681.25 |
| A36 | 193.75 | 631.25 |

From the viewpoint of further reduction of transmittance in a visible wavelength range and further increase of transmittance in an infrared wavelength range of 3500 nm to 4000 nm, $(t_1, t_2)$ in FIG. 2 showing the relation between the thickness $t_1$ of the Si film and the thickness $t_2$ of the silicon nitride film is preferably within the bounds Y defined by connecting Points B1 to B29 shown in the following TABLE 4 in this order with straight lines.

TABLE 4

| Point | $t_1$ (nm) | $t_2$ (nm) |
|---|---|---|
| B1 | 193.75 | 625 |
| B2 | 193.75 | 600 |
| B3 | 175 | 550 |
| B4 | 150 | 512.5 |
| B5 | 125 | 500 |
| B6 | 112.5 | 500 |
| B7 | 100 | 525 |
| B8 | 90 | 525 |
| B9 | 80 | 550 |
| B10 | 80 | 575 |
| B11 | 100 | 575 |
| B12 | 112.5 | 600 |
| B13 | 112.5 | 625 |
| B14 | 90 | 675 |
| B15 | 80 | 675 |
| B16 | 80 | 700 |
| B17 | 90 | 725 |
| B18 | 112.5 | 725 |
| B19 | 125 | 750 |
| B20 | 100 | 800 |
| B21 | 87.5 | 800 |
| B22 | 80 | 825 |
| B23 | 80 | 850 |
| B24 | 90 | 850 |
| B25 | 100 | 875 |
| B26 | 112.5 | 825 |
| B27 | 125 | 800 |
| B28 | 150 | 750 |
| B29 | 175 | 675 |

The thickness $t_1$ of the Si film 11 is preferably 118.75 nm or more, and more preferably 125 nm or more. If the thickness $t_1$ of the Si film 11 is 118.75 nm or more, this ensures that the top plate achieves a light shielding effect in a visible wavelength range. In addition, if the thickness $t_1$ of the Si film 11 is 118.75 nm or more, the design flexibility of the thickness $t_2$ of the silicon nitride film can be increased as shown in FIG. 1.

In this embodiment, description has been given of the case where the Si film 11 is formed between the glass substrate 10 and the silicon nitride film 12. However, the present invention is not limited to this structure and, for example, a glass substrate, a silicon nitride film and a Si film may be stacked in this order. In this case, a protective film for protecting the Si film may be formed on the Si film.

Furthermore, the top plate 1 for a cooking device may have an additional film other than the Si film 11 and the silicon nitride film 12. The additional film may be formed as part of the layered coating 10 or may be formed on the opposite surface of the glass substrate 10 to the surface thereof on which the layered coating 10 is formed. A specific example of the additional film is a film for emitting infrared light in an infrared wavelength range of 2500 nm to 3000 nm.

The layered coating 10 need not necessarily be formed over the entire surface of the glass substrate 10, and at least one of the Si film 11 and the silicon nitride film 12 may not be formed on at least portion of the glass substrate 10. For example, the layered coating 10 may not be formed on a portion of the glass substrate 10 corresponding to a light source (for example, a light emitting diode (LED) for emitting red light) constituting an indicator.

Experimental Examples

TABLES 5 to 10 described below show the light blocking properties, the infrared transmission properties, transmittances at a wavelength of 550 nm (T at 550 nm) of the layered coating 2 and transmittances at a wavelength of 660 nm (T at 660 nm) of the layered coating 2 when the thickness $t_1$ of the Si film 11 and the thickness $t_2$ of the silicon nitride film 12 were changed. The light blocking properties were evaluated as acceptable "○" when the transmittance at a wavelength of 550 nm (T at 550 nm) of the layered coating 2 was 15% or below, and evaluated as unacceptable "x" when T at 550 nm was above 15%. The infrared transmission properties were evaluated as acceptable "○" when the maximum transmittance value of the layered coating 2 in an infrared wavelength range of 3500 nm to 4000 nm was 85% or above, and evaluated as unacceptable "x" when the maximum transmittance value thereof was below 85%. FIGS. 1 and 2 show the light blocking properties at a wavelength of 550 nm and infrared transmission properties of the layered coating 2 when the thickness $t_1$ of the Si film 11 and the thickness $t_2$ of the silicon nitride film 12 were changed. In FIGS. 1 and 2, data represented by filled circles (●) are data when both the transmission properties and infrared transmission properties were evaluated as acceptable "○", and data represented by filled diamonds (◆) are data when at least either of the transmission properties and the infrared transmission properties were evaluated as unacceptable "x". The bounds X defined by connecting Points A1 to A36 in this order with straight lines indicate a borderline region between a region defined by sequentially connecting filled circles (●) with straight lines and a region defined by sequentially connecting filled diamonds (◆) with straight lines.

Figure 3:
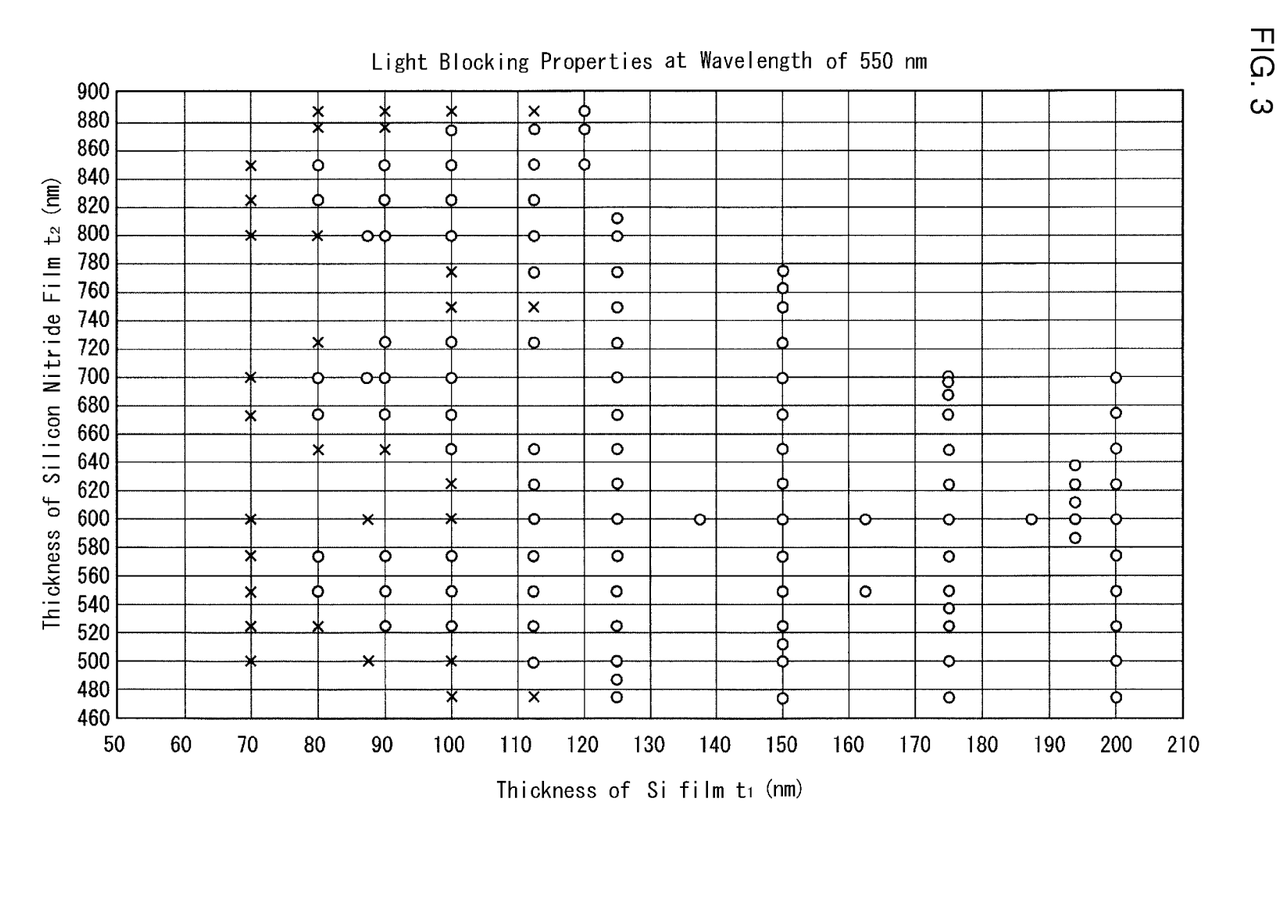
FIG. 3 is a graph showing the light blocking properties at a wavelength of 550 nm of the layered coating when the thickness $t_1$ of the Si film and the thickness $t_2$ of the silicon nitride film were changed.

FIG. 3 is a graph showing the light blocking properties at a wavelength of 550 nm when the thickness $t_1$ of the Si film 11 and the thickness $t_2$ of the silicon nitride film 12 were changed. In FIG. 3, data represented by "○" are data when the light blocking properties were evaluated as acceptable "○", and data represented by "x" are data when the light blocking properties were evaluated as unacceptable "x".

Figure 4:
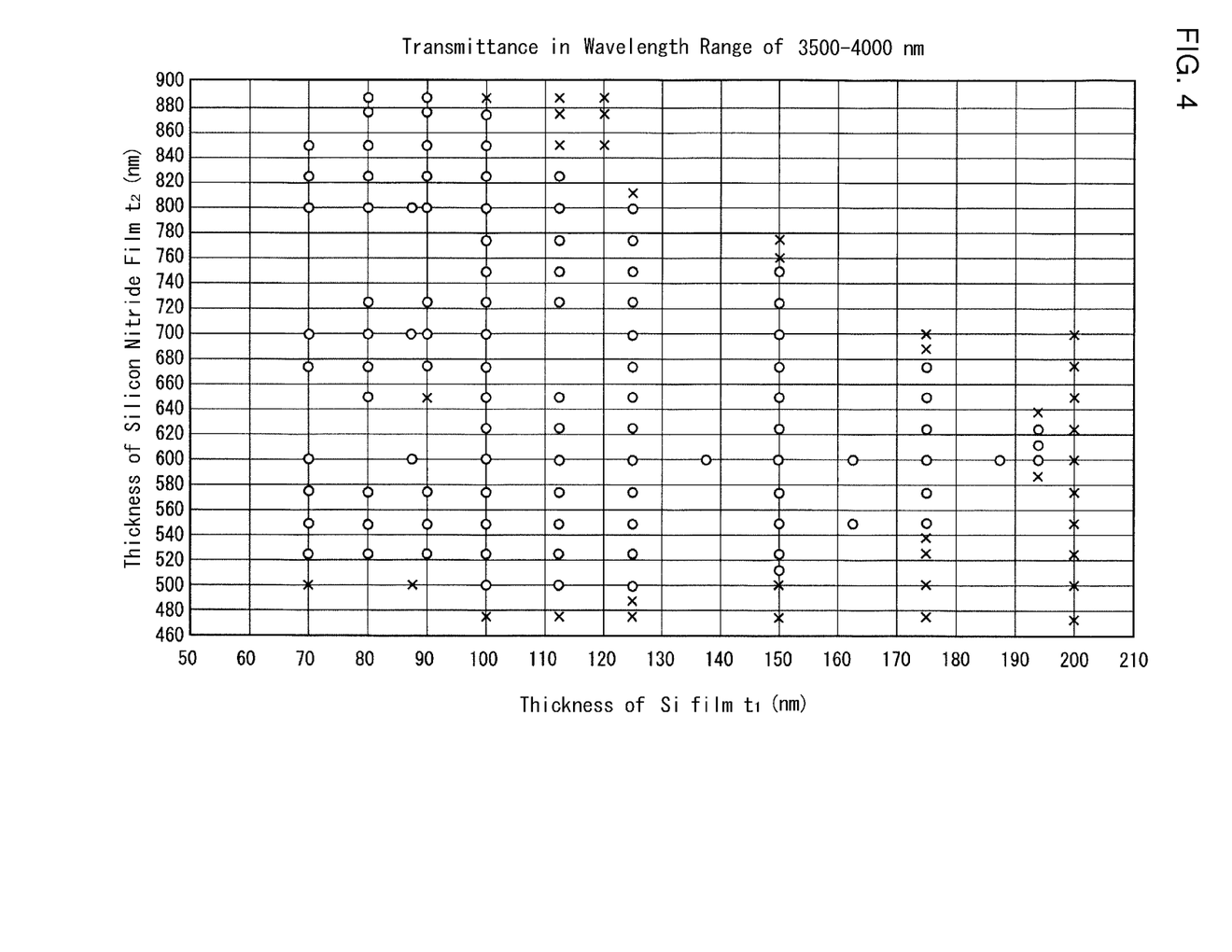
FIG. 4 is a graph showing the infrared transmission properties of the layered coating when the thickness $t_1$ of the Si film and the thickness $t_2$ of the silicon nitride film were changed.

FIG. 4 is a graph showing the infrared transmission properties when the thickness $t_1$ of the Si film 11 and the thickness $t_2$ of the silicon nitride film 12 were changed. In FIG. 3, data represented by "○" are data when the infrared transmission properties were evaluated as acceptable "○", and data represented by "x" are data when the infrared transmission properties were evaluated as unacceptable "x".

Figure 5:
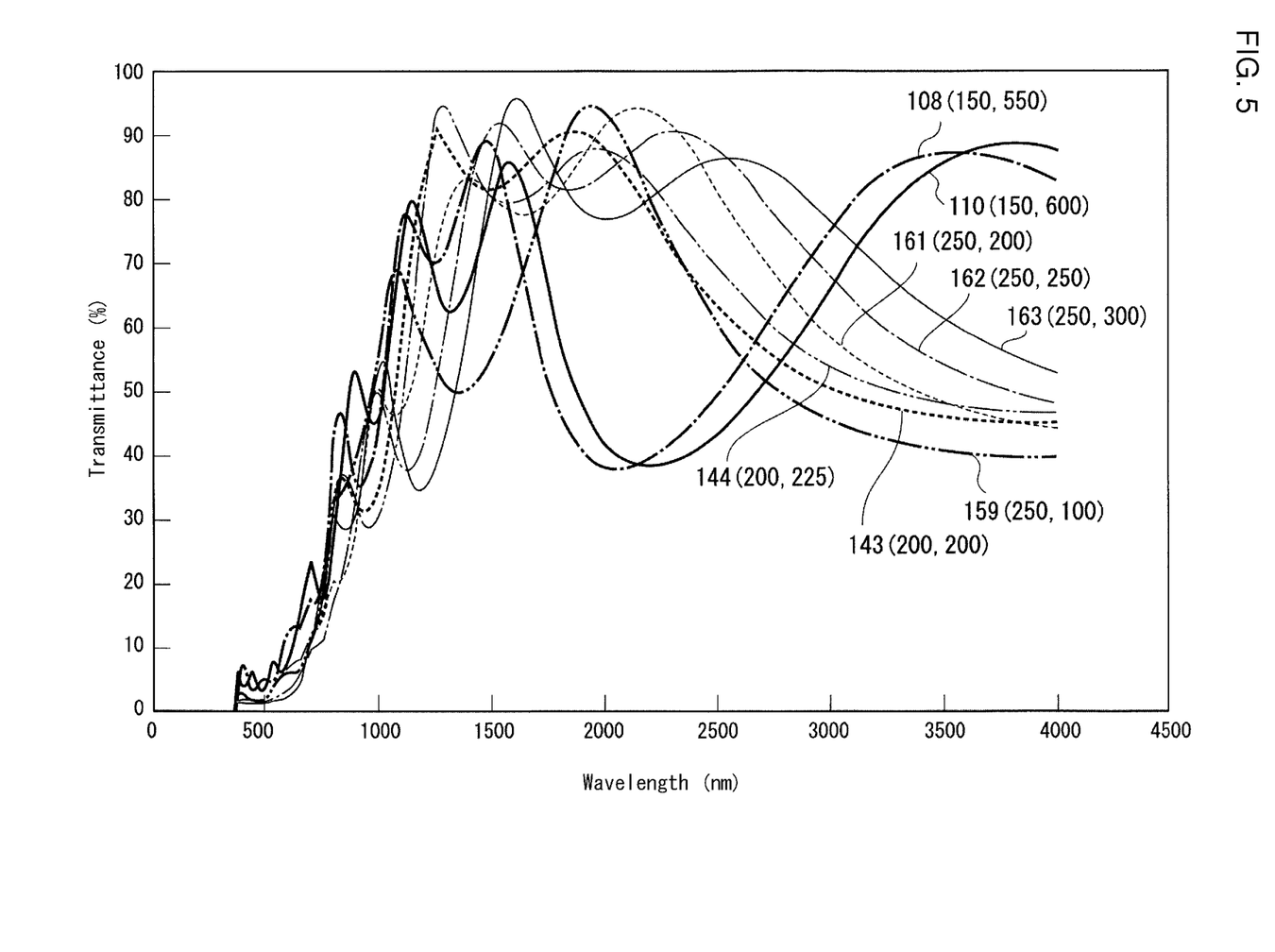
FIG. 5 is a graph showing the transmittances of the layered coating under Conditions 108, 110, 143, 144, 159, 161, 162 and 163.

FIG. 5 is a graph showing the transmittances of the layered coating 2 under Conditions 108, 110, 143, 144, 159, 161, 162 and 163.

TABLE 5

| Condition | Light Blocking | Infrared Transmission | Thickness of Si film (nm) | Thickness of Silicon Nitride Film (nm) | T at 550 nm (%) | T at 660 nm (%) |
|---|---|---|---|---|---|---|
| 1 | X | X | 70 | 400 | 19.72 | 39.84 |
| 2 | X | X | 70 | 500 | 26.49 | 28.66 |
| 3 | X | ○ | 70 | 525 | 21.92 | 30.91 |
| 4 | X | ○ | 70 | 550 | 18.70 | 35.89 |
| 5 | X | ○ | 70 | 575 | 19.12 | 40.14 |
| 6 | X | ○ | 70 | 600 | 23.02 | 38.75 |
| 7 | X | ○ | 70 | 675 | 20.07 | 28.76 |
| 8 | X | ○ | 70 | 700 | 18.42 | 31.42 |
| 9 | X | ○ | 70 | 800 | 22.44 | 32.85 |
| 10 | X | ○ | 70 | 825 | 18.87 | 29.22 |
| 11 | X | ○ | 70 | 850 | 18.89 | 28.91 |
| 12 | X | ○ | 80 | 525 | 16.37 | 26.80 |
| 13 | ○ | ○ | 80 | 550 | 13.26 | 28.93 |
| 14 | ○ | ○ | 80 | 575 | 13.86 | 32.27 |
| 15 | X | ○ | 80 | 650 | 19.52 | 28.96 |
| 16 | ○ | ○ | 80 | 675 | 14.51 | 26.81 |
| 17 | ○ | ○ | 80 | 700 | 13.08 | 26.96 |
| 18 | X | ○ | 80 | 725 | 15.34 | 29.33 |
| 19 | X | ○ | 80 | 800 | 16.93 | 31.89 |
| 20 | ○ | ○ | 80 | 825 | 13.41 | 28.58 |
| 21 | ○ | ○ | 80 | 850 | 13.62 | 26.70 |
| 22 | X | ○ | 80 | 875 | 17.56 | 27.15 |
| 23 | X | ○ | 80 | 887.5 | 20.51 | 28.23 |
| 24 | ○ | X | 87.5 | 400 | 11.62 | 26.65 |
| 25 | X | X | 87.5 | 500 | 18.89 | 22.90 |
| 26 | X | ○ | 87.5 | 600 | 16.49 | 30.76 |
| 27 | ○ | ○ | 87.5 | 700 | 11.00 | 21.84 |
| 28 | ○ | ○ | 87.5 | 800 | 13.90 | 29.54 |

TABLE 6

| Condition | Light Blocking | Infrared Transmission | Thickness of Si film (nm) | Thickness of Silicon Nitride Film (nm) | T at 550 nm (%) | T at 660 nm (%) |
|---|---|---|---|---|---|---|
| 29 | ○ | ○ | 90 | 525 | 12.71 | 20.24 |
| 30 | ○ | ○ | 90 | 550 | 10.49 | 21.83 |
| 31 | ○ | ○ | 90 | 575 | 11.60 | 25.85 |
| 32 | X | ○ | 90 | 650 | 15.46 | 24.57 |
| 33 | ○ | ○ | 90 | 675 | 11.28 | 21.12 |
| 34 | ○ | ○ | 90 | 700 | 10.58 | 20.29 |
| 35 | ○ | ○ | 90 | 725 | 13.23 | 22.23 |

TABLE 6-continued

| Condition | Light Blocking | Infrared Transmission | Thickness of Si film (nm) | Thickness of Silicon Nitride Film (nm) | T at 550 nm (%) | T at 660 nm (%) |
|---|---|---|---|---|---|---|
| 36 | ○ | ○ | 90 | 800 | 13.16 | 28.51 |
| 37 | ○ | ○ | 90 | 825 | 10.57 | 24.01 |
| 38 | ○ | ○ | 90 | 850 | 11.32 | 20.86 |
| 39 | X | ○ | 90 | 875 | 15.55 | 20.39 |
| 40 | X | ○ | 90 | 887.5 | 18.39 | 21.19 |
| 41 | ○ | X | 100 | 250 | 10.70 | 25.65 |
| 42 | ○ | X | 100 | 300 | 11.40 | 20.70 |
| 43 | X | X | 100 | 350 | 17.30 | 15.49 |
| 44 | ○ | X | 100 | 450 | 13.20 | 25.20 |
| 45 | X | X | 100 | 475 | 17.60 | 20.10 |
| 46 | X | ○ | 100 | 500 | 15.40 | 16.40 |
| 47 | ○ | ○ | 100 | 525 | 10.97 | 15.53 |
| 48 | ○ | ○ | 100 | 550 | 9.52 | 17.40 |
| 49 | ○ | ○ | 100 | 575 | 11.02 | 21.99 |
| 50 | X | ○ | 100 | 600 | 15.45 | 26.37 |
| 51 | X | ○ | 100 | 625 | 17.59 | 24.63 |
| 52 | ○ | ○ | 100 | 650 | 13.13 | 19.44 |
| 53 | ○ | ○ | 100 | 675 | 9.95 | 16.13 |
| 54 | ○ | ○ | 100 | 700 | 9.82 | 15.62 |
| 55 | ○ | ○ | 100 | 725 | 12.71 | 22.70 |
| 56 | X | ○ | 100 | 750 | 17.35 | 22.68 |
| 57 | X | ○ | 100 | 775 | 15.90 | 26.56 |
| 58 | ○ | ○ | 100 | 800 | 11.31 | 24.00 |
| 59 | ○ | ○ | 100 | 825 | 9.54 | 18.87 |
| 60 | ○ | ○ | 100 | 850 | 10.71 | 15.92 |
| 61 | ○ | ○ | 100 | 875 | 14.90 | 15.75 |
| 62 | X | X | 100 | 887.5 | 17.18 | 16.70 |

TABLE 7

| Condition | Light Blocking | Infrared Transmission | Thickness of Si film (nm) | Thickness of Silicon Nitride Film (nm) | T at 550 nm (%) | T at 660 nm (%) |
|---|---|---|---|---|---|---|
| 63 | X | X | 112.5 | 475 | 15.24 | 15.67 |
| 64 | ○ | ○ | 112.5 | 500 | 13.26 | 12.90 |
| 65 | ○ | ○ | 112.5 | 525 | 10.15 | 12.72 |
| 66 | ○ | ○ | 112.5 | 550 | 9.20 | 15.10 |
| 67 | ○ | ○ | 112.5 | 575 | 10.68 | 19.90 |
| 68 | ○ | ○ | 112.5 | 600 | 14.03 | 23.35 |
| 69 | ○ | ○ | 112.5 | 625 | 14.94 | 20.04 |
| 70 | ○ | ○ | 112.5 | 650 | 11.68 | 15.16 |
| 71 | ○ | ○ | 112.5 | 725 | 12.06 | 15.57 |
| 72 | X | ○ | 112.5 | 750 | 15.13 | 20.58 |
| 73 | ○ | ○ | 112.5 | 775 | 13.64 | 23.29 |
| 74 | ○ | ○ | 112.5 | 800 | 10.39 | 19.35 |
| 75 | ○ | ○ | 112.5 | 825 | 9.22 | 14.70 |
| 76 | ○ | X | 112.5 | 850 | 10.41 | 12.62 |
| 77 | ○ | X | 112.5 | 875 | 13.67 | 13.06 |
| 78 | X | X | 112.5 | 887.5 | 15.05 | 14.24 |
| 79 | ○ | X | 120 | 850 | 9.59 | 11.81 |
| 80 | ○ | X | 120 | 875 | 12.11 | 12.57 |
| 81 | ○ | X | 120 | 887.5 | 13.25 | 13.86 |
| 82 | ○ | X | 125 | 450 | 10.10 | 17.84 |
| 83 | ○ | X | 125 | 475 | 12.26 | 13.65 |
| 84 | ○ | X | 125 | 487.5 | 12.33 | 12.38 |
| 85 | ○ | ○ | 125 | 500 | 11.49 | 11.72 |
| 86 | ○ | ○ | 125 | 525 | 9.14 | 12.07 |
| 87 | ○ | ○ | 125 | 550 | 8.14 | 14.80 |
| 88 | ○ | ○ | 125 | 575 | 8.93 | 19.31 |
| 89 | ○ | ○ | 125 | 600 | 11.20 | 21.10 |
| 90 | ○ | ○ | 125 | 625 | 12.38 | 17.23 |
| 91 | ○ | ○ | 125 | 650 | 10.38 | 13.26 |
| 92 | ○ | ○ | 125 | 675 | 8.48 | 11.64 |
| 93 | ○ | ○ | 125 | 700 | 8.27 | 12.28 |
| 94 | ○ | ○ | 125 | 723 | 9.83 | 15.28 |
| 95 | ○ | ○ | 125 | 750 | 12.12 | 19.85 |
| 96 | ○ | ○ | 125 | 775 | 11.73 | 20.83 |
| 97 | ○ | ○ | 125 | 800 | 9.35 | 16.62 |
| 98 | ○ | X | 125 | 812.5 | 8.54 | 14.49 |
| 99 | ○ | ○ | 137.5 | 600 | 8.66 | 19.00 |

TABLE 8

| Condition | Light Blocking | Infrared Transmission | Thickness of Si film (nm) | Thickness of Silicon Nitride Film (nm) | T at 550 nm (%) | T at 660 nm (%) |
|---|---|---|---|---|---|---|
| 100 | ○ | X | 150 | 100 | 6.30 | 15.60 |
| 101 | ○ | X | 150 | 250 | 5.60 | 16.79 |
| 102 | ○ | X | 150 | 350 | 8.40 | 11.56 |
| 103 | ○ | X | 150 | 450 | 6.20 | 14.96 |
| 104 | ○ | X | 150 | 475 | 8.24 | 12.56 |
| 105 | ○ | X | 150 | 500 | 7.76 | 11.36 |
| 106 | ○ | ○ | 150 | 512.5 | 6.68 | 11.33 |
| 107 | ○ | ○ | 150 | 525 | 5.73 | 11.68 |
| 108 | ○ | ○ | 150 | 550 | 4.80 | 13.49 |
| 109 | ○ | ○ | 150 | 575 | 5.34 | 15.97 |
| 110 | ○ | ○ | 150 | 600 | 7.20 | 16.66 |
| 111 | ○ | ○ | 150 | 625 | 8.48 | 14.63 |
| 112 | ○ | ○ | 150 | 650 | 6.79 | 12.33 |
| 113 | ○ | ○ | 150 | 675 | 5.16 | 11.31 |
| 114 | ○ | ○ | 150 | 700 | 4.90 | 11.83 |
| 115 | ○ | ○ | 150 | 725 | 6.01 | 13.80 |
| 116 | ○ | ○ | 150 | 750 | 8.08 | 16.22 |
| 117 | ○ | X | 150 | 762.5 | 8.50 | 16.78 |
| 118 | ○ | X | 150 | 775 | 7.97 | 16.52 |
| 119 | ○ | ○ | 162.5 | 550 | 4.12 | 11.00 |
| 120 | ○ | ○ | 162.5 | 600 | 6.28 | 14.40 |
| 121 | ○ | X | 175 | 450 | 4.78 | 11.62 |
| 122 | ○ | X | 175 | 475 | 6.01 | 9.41 |
| 123 | ○ | X | 175 | 500 | 5.43 | 7.99 |
| 124 | ○ | X | 175 | 525 | 4.13 | 7.80 |
| 125 | ○ | X | 175 | 537.5 | 3.77 | 8.17 |
| 126 | ○ | ○ | 175 | 550 | 3.64 | 8.86 |
| 127 | ○ | ○ | 175 | 575 | 4.13 | 10.97 |
| 128 | ○ | ○ | 175 | 600 | 5.42 | 12.50 |
| 129 | ○ | ○ | 175 | 625 | 6.02 | 11.36 |
| 130 | ○ | ○ | 175 | 650 | 4.79 | 9.17 |
| 131 | ○ | ○ | 175 | 675 | 3.80 | 7.89 |
| 132 | ○ | X | 175 | 687.5 | 3.66 | 7.72 |
| 133 | ○ | X | 175 | 697.5 | 3.71 | 7.81 |
| 134 | ○ | X | 175 | 700 | 3.75 | 7.87 |
| 135 | ○ | ○ | 187.5 | 600 | 4.45 | 10.99 |

TABLE 9

| Condition | Light Blocking | Infrared Transmission | Thickness of Si film (nm) | Thickness of Silicon Nitride Film (nm) | T at 550 nm (%) | T at 660 nm (%) |
|---|---|---|---|---|---|---|
| 136 | ○ | X | 193.75 | 587.5 | 3.48 | 10.09 |
| 137 | ○ | ○ | 193.75 | 600 | 4.00 | 10.36 |
| 138 | ○ | ○ | 193.75 | 612.5 | 4.44 | 9.88 |
| 139 | ○ | ○ | 193.75 | 625 | 4.56 | 8.91 |
| 140 | ○ | X | 193.75 | 637.5 | 4.26 | 7.86 |
| 141 | ○ | X | 200 | 100 | 3.32 | 9.05 |
| 142 | ○ | X | 200 | 150 | 2.70 | 9.05 |
| 143 | ○ | X | 200 | 200 | 4.27 | 6.56 |
| 144 | ○ | X | 200 | 225 | 3.88 | 8.35 |
| 145 | ○ | X | 200 | 250 | 2.96 | 9.79 |
| 146 | ○ | X | 200 | 300 | 2.93 | 6.91 |
| 147 | ○ | X | 200 | 350 | 4.28 | 5.77 |
| 148 | ○ | X | 200 | 450 | 3.17 | 8.57 |
| 149 | ○ | X | 200 | 475 | 4.06 | 6.72 |
| 150 | ○ | X | 200 | 500 | 3.84 | 5.77 |
| 151 | ○ | X | 200 | 525 | 2.92 | 5.84 |
| 152 | ○ | X | 200 | 550 | 2.52 | 6.94 |
| 153 | ○ | X | 200 | 575 | 2.76 | 8.86 |
| 154 | ○ | X | 200 | 600 | 3.60 | 9.78 |
| 155 | ○ | X | 200 | 625 | 4.16 | 8.31 |
| 156 | ○ | X | 200 | 650 | 3.41 | 6.54 |
| 157 | ○ | X | 200 | 675 | 2.66 | 5.72 |
| 158 | ○ | X | 200 | 700 | 2.55 | 5.92 |
| 159 | ○ | X | 250 | 100 | 1.61 | 5.59 |
| 160 | ○ | X | 250 | 150 | 1.34 | 3.84 |
| 161 | ○ | X | 250 | 200 | 2.10 | 4.07 |

TABLE 9-continued

| Condition | Light Blocking | Infrared Transmission | Thickness of Si film (nm) | Thickness of Silicon Nitride Film (nm) | T at 550 nm (%) | T at 660 nm (%) |
|---|---|---|---|---|---|---|
| 162 | ○ | X | 250 | 250 | 1.44 | 5.82 |
| 163 | ○ | X | 250 | 300 | 1.46 | 4.46 |
| 164 | ○ | X | 250 | 325 | 1.84 | 3.79 |
| 165 | ○ | X | 250 | 350 | 2.01 | 3.69 |

TABLE 10

| Condition | Light Blocking | Infrared Transmission | Thickness of Si film (nm) | Thickness of Silicon Nitride Film (nm) | T at 550 nm (%) | T at 660 nm (%) |
|---|---|---|---|---|---|---|
| 166 | ○ | X | 300 | 0 | 0.62 | 2.22 |
| 167 | ○ | X | 300 | 50 | 0.95 | 3.04 |
| 168 | ○ | X | 300 | 100 | 0.77 | 3.32 |
| 169 | ○ | X | 300 | 150 | 0.65 | 2.29 |
| 170 | ○ | X | 300 | 200 | 1.02 | 2.53 |
| 171 | ○ | X | 300 | 250 | 0.69 | 3.56 |
| 172 | ○ | X | 300 | 300 | 0.68 | 2.63 |
| 173 | ○ | X | 300 | 350 | 0.98 | 2.25 |
| 174 | ○ | X | 300 | 400 | 0.61 | 3.20 |
| 175 | ○ | X | 300 | 450 | 0.77 | 3.17 |
| 176 | ○ | X | 300 | 600 | 0.87 | 3.55 |

The results shown in the above TABLES 5 to 10 and FIGS. 1 and 2 have revealed that if the Si film 11 and the silicon nitride film 12 are formed so that ($t_1$, $t_2$) can be within the bounds X shown in FIG. 1, preferably within the bounds Y shown in FIG. 2, the transmittance in an infrared wavelength range of 3500 nm to 4000 nm can be high while the transmittance in a visible wavelength range can be low. Therefore, by using the top plate 1 for a cooking device in which the Si film 11 and the silicon nitride film 12 are formed so that ($t_1$, $t_2$) can be within the bounds X shown in FIG. 1, preferably within the bounds Y shown in FIG. 2, an electric cooking device can be provided which enables not only temperature detection in a high temperature range but also temperature detection in a low temperature range of 200° C. or below and has excellent aesthetic appearance because the internal structure disposed under the top plate, such as a heating mechanism and wiring, is difficult to view.

Associated with the transmittance of the layered coating 2 are both of light absorption in the layered coating 2 and light reflection on the surfaces of the Si film 11 and the silicon nitride film 12. Therefore, as shown in FIG. 5, if the thickness $t_1$ of the Si film 11 and the thickness $t_2$ of the silicon nitride film 12 change, the shape of the transmittance curve for the layered coating 2 significantly changes. Thus, although the transmittance of the layered coating 2 at a particular wavelength does not monotonically change with changes in the thickness $t_1$ of the Si film 11 or the thickness $t_2$ of the silicon nitride film 12, a rough tendency is found that with decreasing thickness $t_1$ of the Si film 11, the light blocking properties in a visible wavelength range are reduced as shown in FIG. 3. When the thickness $t_2$ of the silicon nitride film 12 is within the range of 460 nm to 900 nm, the light blocking properties in a visible wavelength range may be insufficient depending on the thickness $t_2$ of the silicon nitride film 12 if the thickness $t_1$ of the Si film 11 is 112.5 nm or less, but sufficient light blocking properties in a visible wavelength range are achieved regardless of the thickness $t_2$ of the silicon nitride film 12 if the thickness $t_1$ of the Si film 11 is greater than 112.5 nm.

Furthermore, as shown in FIG. 4, there is a rough tendency that with increasing thickness $t_1$ of the Si film 11, the infrared transmission properties are reduced. Moreover, there is also a rough tendency that also if the thickness $t_2$ of the silicon nitride film 12 is too small and too large, the infrared transmission properties are reduced. From the viewpoint of achievement of high infrared transmittance, the thickness $t_1$ of the Si film 11 is preferably smaller than 200 nm, and more preferably 193.75 nm or less.

REFERENCE SIGNS LIST

1 . . . top plate for cooking device
2 . . . layered coating
10 . . . glass substrate
11 . . . Si film
12 . . . silicon nitride film

The invention claimed is:
1. A top plate for a cooking device comprising:
a glass substrate; and
a layered coating made of a Si film and a silicon nitride film which are formed on the glass substrate, wherein
a transmittance of the layered coating at a wavelength of 550 nm is 15% or less, and a maximum transmittance value of the layered coating in an infrared wavelength range of 3500 nm to 4000 nm is 85% or more; and
where $t_1$ represents the thickness of the Si film and $t_2$ represents the thickness of the silicon nitride film, ($t_1$, $t_2$) is within the bounds defined by connecting Points A1 to A36 shown in the following TABLE 1 in this order with straight lines:

TABLE 1

| Point | $t_1$ (nm) | $t_2$ (nm) |
|---|---|---|
| A1 | 196.9 | 625 |
| A2 | 196.9 | 600 |
| A3 | 193.75 | 593.5 |
| A4 | 175 | 543.75 |

TABLE 1-continued

| Point | $t_1$ (nm) | $t_2$ (nm) |
|---|---|---|
| A5 | 150 | 506.25 |
| A6 | 125 | 493.75 |
| A7 | 112.5 | 487.5 |
| A8 | 100 | 512.5 |
| A9 | 90 | 512.5 |
| A10 | 80 | 537.5 |
| A11 | 75 | 550 |
| A12 | 75 | 575 |
| A13 | 80 | 587.5 |
| A14 | 100 | 587.5 |
| A15 | 107.5 | 600 |
| A16 | 107.5 | 625 |
| A17 | 90 | 662.5 |
| A18 | 80 | 662.5 |
| A19 | 75 | 675 |
| A20 | 75 | 700 |
| A21 | 85 | 725 |
| A22 | 100 | 737.5 |
| A23 | 112.5 | 737.5 |
| A24 | 118.75 | 750 |
| A25 | 100 | 787.5 |
| A26 | 83.75 | 800 |
| A27 | 75 | 825 |
| A28 | 75 | 850 |
| A29 | 80 | 862.5 |
| A30 | 90 | 862.5 |
| A31 | 100 | 881.25 |
| A32 | 112.5 | 837.5 |
| A33 | 125 | 806.25 |
| A34 | 150 | 756.25 |
| A35 | 175 | 681.25 |
| A36 | 193.75 | 631.25 |

2. The top plate for a cooking device according to claim 1, wherein ($t_1$, $t_2$) is within the bounds defined by connecting Points B1 to B29 shown in the following TABLE 2 in this order with straight lines:

TABLE 2

| Point | $t_1$ (nm) | $t_2$ (nm) |
|---|---|---|
| B1 | 193.75 | 625 |
| B2 | 193.75 | 600 |
| B3 | 175 | 550 |
| B4 | 150 | 512.5 |

TABLE 2-continued

| Point | $t_1$ (nm) | $t_2$ (nm) |
|---|---|---|
| B5 | 125 | 500 |
| B6 | 112.5 | 500 |
| B7 | 100 | 525 |
| B8 | 90 | 525 |
| B9 | 80 | 550 |
| B10 | 80 | 575 |
| B11 | 100 | 575 |
| B12 | 112.5 | 600 |
| B13 | 112.5 | 625 |
| B14 | 90 | 675 |
| B15 | 80 | 675 |
| B16 | 80 | 700 |
| B17 | 90 | 725 |
| B18 | 112.5 | 725 |
| B19 | 125 | 750 |
| B20 | 100 | 800 |
| B21 | 87.5 | 800 |
| B22 | 80 | 825 |
| B23 | 80 | 850 |
| B24 | 90 | 850 |
| B25 | 100 | 875 |
| B26 | 112.5 | 825 |
| B27 | 125 | 800 |
| B28 | 150 | 750 |
| B29 | 175 | 675. |

3. The top plate for a cooking device according to claim 1, wherein the thickness $t_1$ of the Si film is 118.75 nm to 196.9 nm.

4. The top plate for a cooking device according to claim 1, wherein the thickness $t_1$ of the Si film is 125 nm to 196.9 nm.

5. The top plate for a cooking device according to claim 1, wherein the silicon nitride film is made substantially of $Si_3N_4$.

6. The top plate for a cooking device according to claim 1, wherein the Si film is formed between the glass substrate and the silicon nitride film.

7. The top plate for a cooking device according to claim 1, wherein a total content of additives and/or impurities in the Si film is 1% or less.

8. The top plate for a cooking device according to claim 1, wherein the glass substrate comprises $Li_2O$—$Al_2O_3$—$SiO_2$-based crystallized glass substrate.

9. The top plate for a cooking device according to claim 1, wherein the thickness of the glass substrate is 3 mm to 5 mm.

* * * * *